(12) United States Patent
McKenna

(10) Patent No.: US 6,732,388 B2
(45) Date of Patent: May 11, 2004

(54) OVERFLOW SYSTEM

(75) Inventor: Malachi C. McKenna, London (GB)

(73) Assignee: Watersave Enterprises Limited (IE)

( * ) Notice: Subject to any disclaimer, the term of this patent is extended or adjusted under 35 U.S.C. 154(b) by 0 days.

(21) Appl. No.: 10/155,795

(22) Filed: May 24, 2002

(65) Prior Publication Data

US 2002/0194674 A1 Dec. 26, 2002

Related U.S. Application Data

(63) Continuation of application No. PCT/GB00/04560, filed on Nov. 29, 2000.

(30) Foreign Application Priority Data

Nov. 29, 1999 (GB) ............................................... 9928195
Aug. 21, 2000 (GB) ............................................... 0020593

(51) Int. Cl.[7] ................................................ A47K 3/00
(52) U.S. Cl. ............................ 4/669; 4/683; 137/428
(58) Field of Search ......................... 4/668, 669, 508, 4/680, 683, 694; 137/410, 428

(56) References Cited

U.S. PATENT DOCUMENTS

| | | | | |
|---|---|---|---|---|
| 1,010,469 A | * | 12/1911 | Weaver ..................... | 4/694 X |
| 1,103,756 A | * | 7/1914 | Gebhardt ................... | 4/668 X |
| 1,744,073 A | * | 1/1930 | Gordon et al. .............. | 4/669 |
| 4,185,336 A | | 1/1980 | Young ...................... | 4/286 |
| 4,258,444 A | | 3/1981 | Orszullok .................. | 4/538 |
| 5,125,621 A | * | 6/1992 | Parsons et al. ......... | 4/DIG. 3 X |

FOREIGN PATENT DOCUMENTS

| | | |
|---|---|---|
| DE | 118499 | 3/1901 |
| FR | 650824 | 2/1929 |
| GB | 2263060 A | 7/1993 |
| GB | 2267513 A | 12/1993 |
| GB | 2320769 A | 7/1998 |

* cited by examiner

Primary Examiner—Robert M. Petsuba
(74) Attorney, Agent, or Firm—Schwegman, Lundberg, Woessner & Kluth, P.A.

(57) ABSTRACT

An overflow system suitable for use in controlling the level of water in, for example, a bathtub (3) is described. The overflow system comprises a conduit attached to the overflow outlet (21) of the bathtub (3) and is arranged so that when the bathtub (3) is overfilled, any excessive flow rate of overflow water through the conduit (19) is detected. The excessive flow rate is detected by arranging for the outlet (25) of the conduit to have a smaller maximum flow rate than the inlet (23) of the conduit so that water backs up within the conduit during an excessive flow rate condition. The backed up water may be detected by a reed switch (31) in conjunction with a magnetic float (27) in order to actuate a solenoid valve (9) to prevent any more water from entering the bathtub (3).

16 Claims, 6 Drawing Sheets

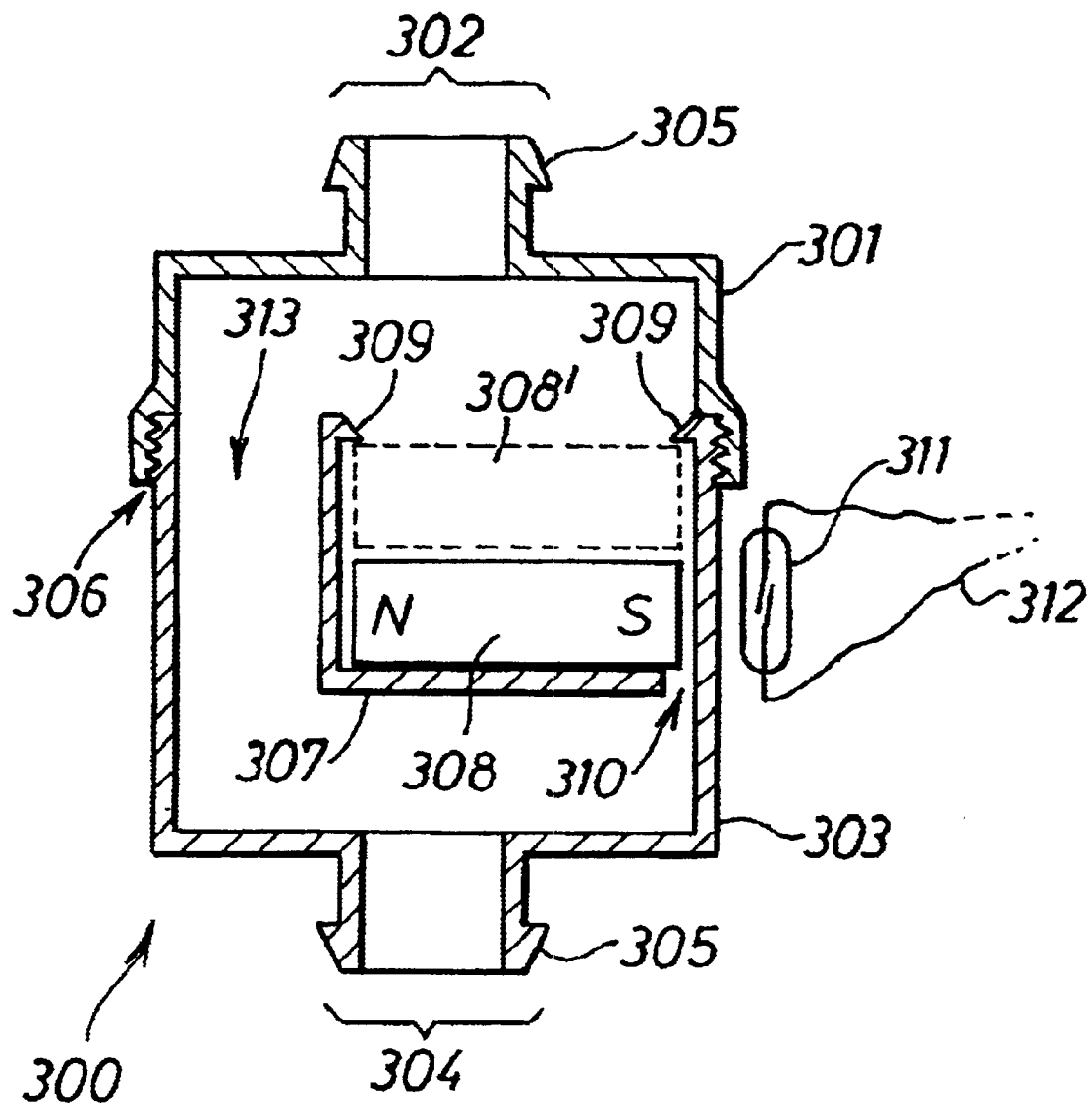

OVERFLOW SYSTEM

RELATED APPLICATIONS

This application is a continuation under 35 U.S.C. 111(a) of International Application No. PCT/GB00/04560 filed Nov. 29, 2000 and published in English on Jun. 7, 2001 as WO01/40587 A1, which claims priority from United Kingdom Application No. 0020593.0 filed Aug. 21, 2000 and United Kingdom Application No. 9928195.8 filed Nov. 29, 1999, all of which applications are incorporated herein by reference.

FIELD OF THE INVENTION

This invention relates to an apparatus for preventing the overfilling of a vessel with fluid and in particular but not exclusively to an apparatus for preventing the overfilling of a bathtub with water.

BACKGROUND OF THE INVENTION

It is well known that the pressure of the mains water supply to a building depends upon both the distance of the nearest water tower to the building and upon the head of water from the water tower to the building. The pressure of a water supply within a building may also vary. For example, a hotel may be provided with a water tank in the loft for supplying water to the individual rooms, in which case the pressure of the water supply to a particular room will depend on how many floors below the water tank the room is situated. Each hotel room is typically provided with a bathroom and a bathtub and, due to the variation of the pressure of the water supply, on different floors the taps used for filling the bathtub will have different maximum flow rates. Although bathtubs are conventionally provided with an overflow to convey excess water from the bathtub to a drain, for some bathtubs the flow rate of the water from the taps into the bathtub exceeds the rate at which the overflow can convey excess water to the drain. Thus there is a risk that if the taps should inadvertently be left on, or if a tap fails in the open position, then water will overflow the sides of the bath with consequential economic loss and structural damage. Accordingly there is a need to prevent such overflow.

An overflow control fitting for a bath is described in UK patent application GB 2263060. In GB 2263060, a capacitive level sensor is mounted at a level between the overflow outlet and the rim of a bathtub. A vertical tube allows water from the overflow outlet to reach the capacitive level sensor. A disadvantage of capacitive level sensors is that condensation of steam from the relatively warm water in a bathtub can cause false triggering of the sensor.

SUMMARY OF THE INVENTION

According to one aspect of the present invention there is provided a flow control system for a vessel comprising a liquid supply means and a drain, the flow control system comprising:

overflow means situated at a predetermined height in the vessel for drawing liquid from the vessel;

a flow rate sensor associated with the overflow means, the sensor being operable to provide an output when the flow rate through the overflow exceeds a predetermined flow rate; and control means responsive to the sensor output for controlling the liquid supply to the vessel.

An advantage of such an apparatus is that it prevents a bathtub from inadvertently being overfilled. A further advantage of such an apparatus is that it allows a person to start filling their bathtub and then leave the apparatus to turn off the water supply to the bath without danger of overfilling the bathtub.

According to a second aspect of the invention, there is provided an overflow detector for use with a vessel having an overflow at a predetermined level for discharging liquid from the vessel comprising:

a conduit comprising an inlet for connection to the overflow, and an outlet; and a sensor for providing an indicating signal when liquid flows through the overflow at a flow rate that exceeds a predetermined flow rate.

Other aspects of the invention provide an overflow system for a vessel, a combination of a vessel and an overflow detector, and a kit of parts for fitting to a vessel.

Preferred embodiments of the present invention will now be described by way of example only and with reference to the following drawings of which:

BRIEF DESCRIPTION OF THE DRAWINGS

FIG. 6 shows a cross-section, in a vertical plane along the centre line of a bathtub, of a fourth embodiment that is suitable for retrofitting to existing bathtub installations.

DETAILED DESCRIPTION

Figure 1:
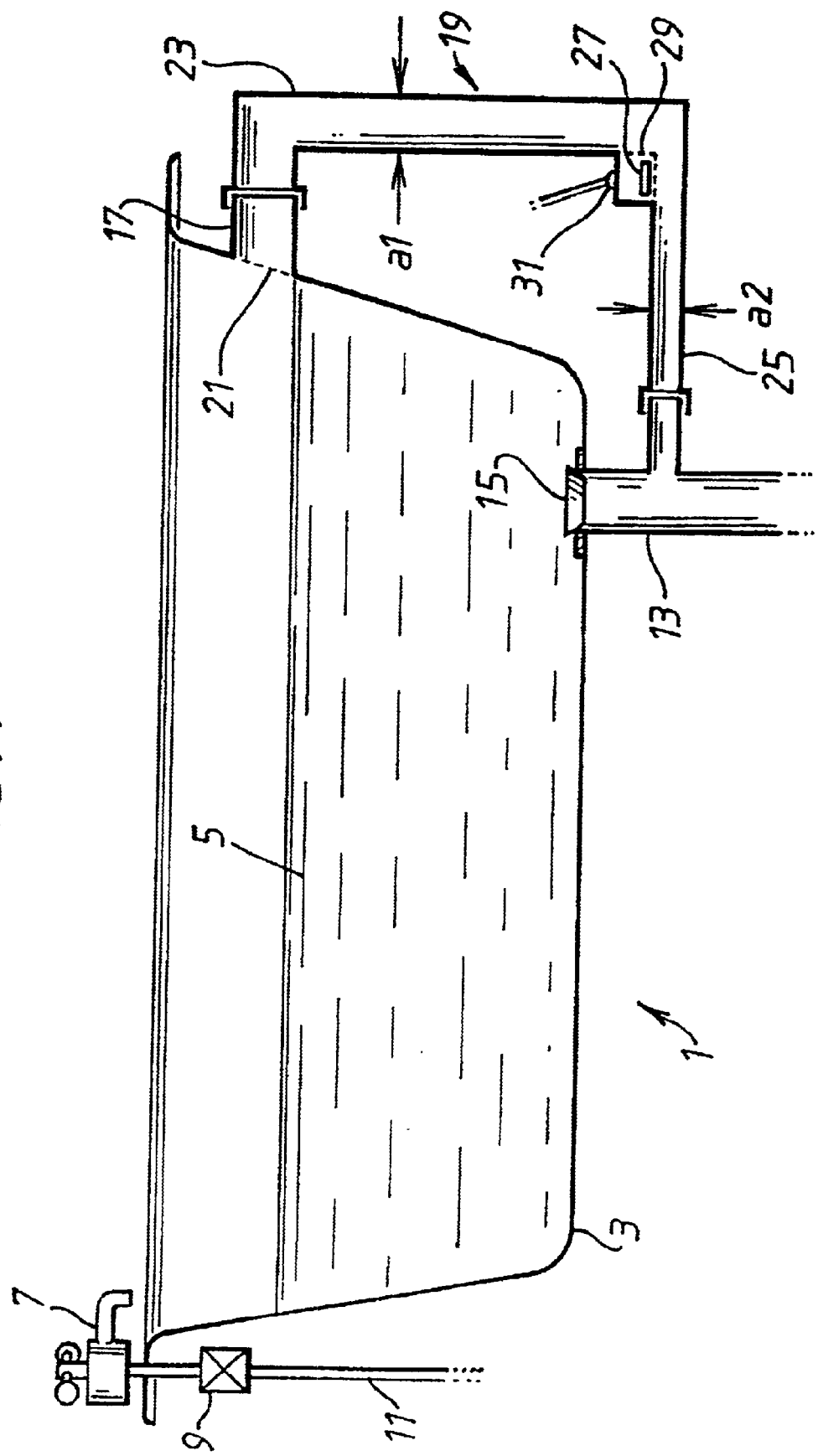
FIG. 1 shows a cross-section, in a vertical plane along the centre line of a bathtub, of the plumbing arrangements for a bath system according to a first embodiment of the present invention.

FIG. 1 shows a bath system 1 comprising a bathtub 3.

A cold tap 7 is connected to a cold water supply pipe 11 via a solenoid valve 9. Water 5 may be introduced into the bathtub 3 via the cold tap 7.

The nominal capacity of the bathtub 3, illustrated by the level of the water 5, is defined by the vertical offset of an overflow duct 17 above a water drainpipe 13. The overflow duct 17 allows water that is above the level of the overflow duct 17 to flow to a mains drainage system (not shown). The water drainpipe 13 connects to a mains drainage system (not shown) and allows water to be drained from the bathtub 3 when a bathplug 15 is removed from the water drainpipe 13.

An overflow assembly 19 connects the overflow duct 17 to the water drainpipe 13; water enters the overflow assembly 19 through an inlet duct 23 and leaves via an outlet duct 25. Mounted within the overflow assembly 19 are a magnetic float 27, a float cage 29 and a reed switch 31. An overflow strainer 21 prevents detritus from entering the overflow duct 17.

Note that whereas the cold tap 7 is mounted on the centre line of the bathtub 3, mounted to one side of the centre line and thus not visible in FIG. 1 is a hot tap 33 (seen in FIG. 3) connected to a hot water supply pipe 37 via a normally open solenoid valve 35. Note also that the cold tap 7 has been shown at the end of the bathtub 3 remote from the water drainpipe 13 in order to improve the clarity of FIG. 1; the taps 7, 33 may, more conventionally, be mounted at the same end of the bathtub 3 adjacent the water drainpipe 13.

To prepare the bathtub 3 for bathing, a user inserts the bath plug 15 into the water drainpipe 13, opens the taps 7 and 33, and waits until there is sufficient water in the bath. At this point the user would normally close the taps 7, 33. If the user does not close the taps 7, 33 then the bathtub 3 will continue filling until it reaches its nominal capacity of water 5 beyond which the excess water will flow via the overflow duct 17 and the overflow assembly 19 to the water drainpipe 13.

Figure 2:
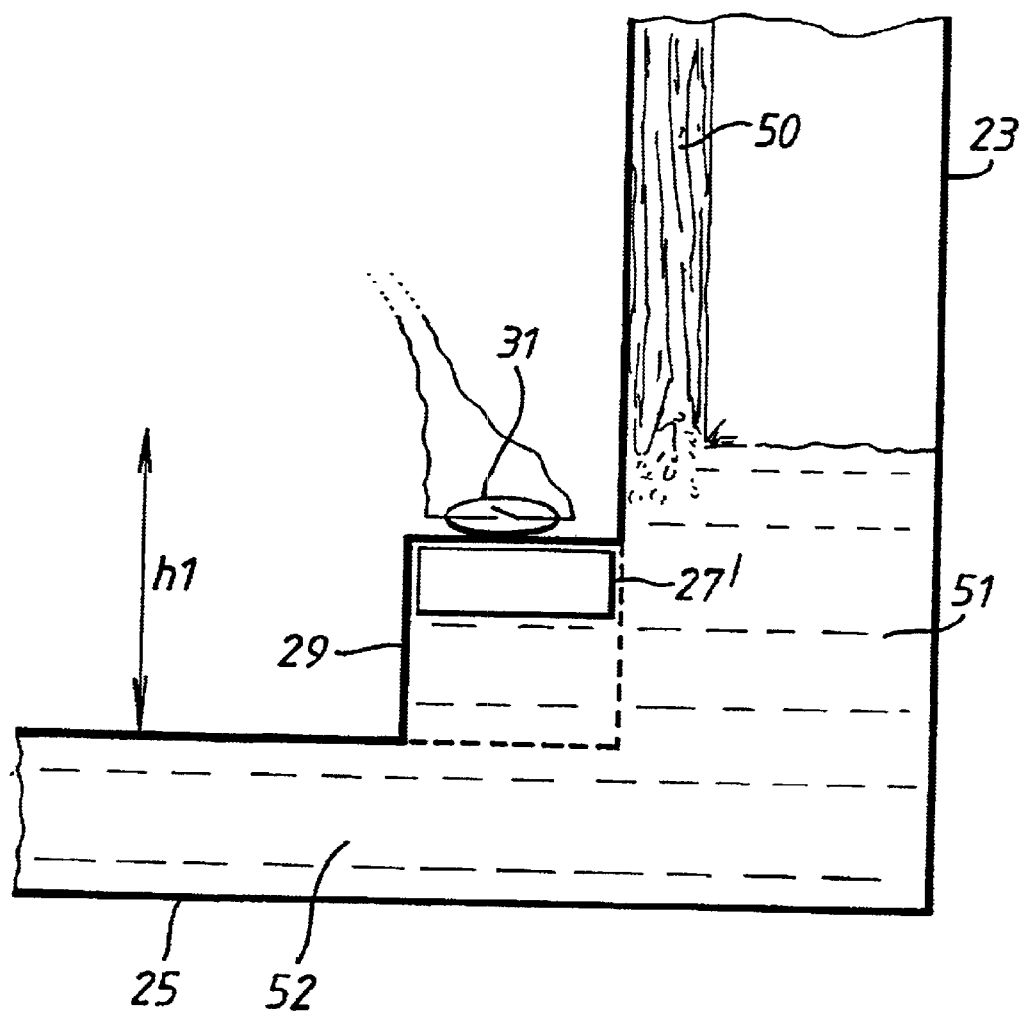
FIG. 2 shows a portion of the bath system of FIG. 1 in more detail in the condition in which the bath system is overflowing.

FIG. 2 depicts a situation in which excess water is being added to a bathtub 3 which is already nominally full of water 5 and shows in more detail the junction between the inlet duct 23 and the outlet duct 25, and also illustrates outlet water 52 within the outlet duct 25, overflow water 50 falling down the inlet duct 23, backed-up water 51, the float cage 29, the magnetic float in an alternative position 27' and the reed switch 31.

As shown, the overflow water 50 passes through the overflow duct 17 and subsequently falls down the inlet duct 23 into a region of backed-up water 51. The backed-up water 51 extends from the outlet duct 25 into the inlet duct 23 and arises because the cross-sectional area, a1, of the inlet duct 23, and of the overflow duct 17, is greater than the cross-sectional area, a2, of the outlet duct 25.

At low flow rates all of the overflow water 50 will pass as outlet water 52 through the outlet duct 25. However, at moderate flow rates the reduced cross-sectional area, a2, of the outlet duct 25 impedes the flow of the outlet water 52 and thus backed-up water 51 will accumulate.

The surface of the backed-up water 51 is higher than the level of the outlet duct 25 and results in a head of water, h1, which exerts a small pressure upon the outlet water 52 in the outlet duct 25. This small pressure acts to increase the flow rate of the outlet duct 25, bringing the flow rates of the overflow water 50 and the outlet water 52 into equilibrium. Higher overflow water 50 flow rates will increase the extent to which the backed-up water 51 rises up into the inlet duct 23 until, at a sufficiently great flow rate, the entire inlet duct 23 becomes full of water and there is no longer any distinction between the overflow water 50 and the backed-up water 51.

The float cage 29 is provided at the junction of the inlet duct 23 and the outlet duct 25 and constrains the magnetic float 27 to move vertically in response to the level of any backed-up water 51. Apertures which communicate with the inlet duct 23 and with the outlet duct 25 are provided in the float cage 29, so that as the level of the backed-up water 51 rises it can displace air from within the float cage 29.

At low overflow water 50 flow rates, the magnetic float 27 rests on the bottom of the float cage 29. As the flow rate of the overflow water 50 increases to moderate, backed-up water 51 will develop and the level of this backed-up water 51 will gradually increase, floating the magnetic float 27 until (with a sufficiently high flow rate) it comes to rest against the top of the float cage 29 in the position 27'. In the position 27' the magnetic field of the magnetic float 27 causes the reed switch 31 to become closed with the result that the solenoid valves 9, 35 are actuated to prevent any more water entering the bathtub 3 via the taps 7, 33.

Figure 3:
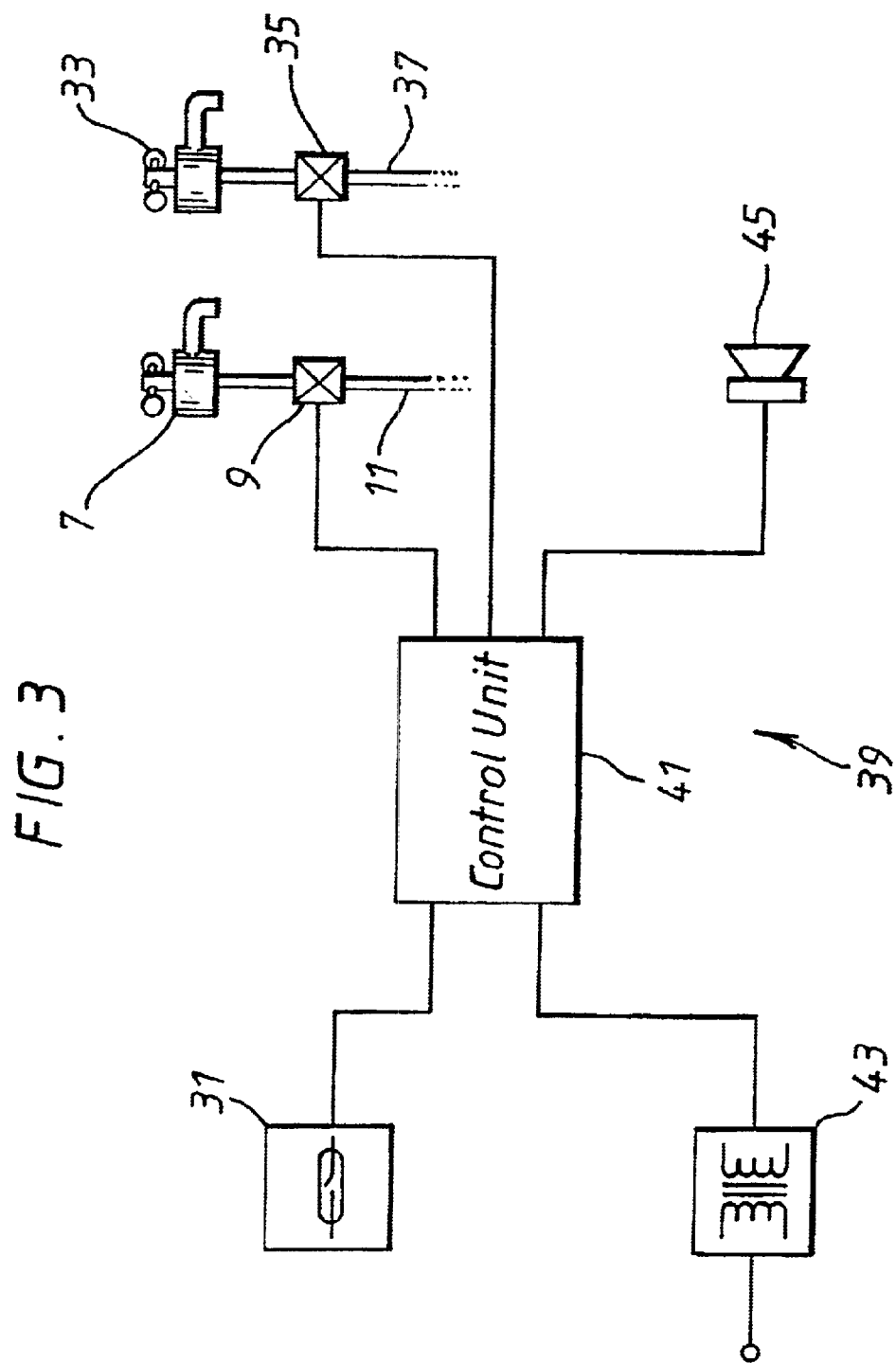
FIG. 3 shows a schematic diagram of a control system suitable for use in conjunction with the bath system of FIG. 1.

FIG. 3 is a block diagram of a control system 39, suitable for use in conjunction with the bath system 1, comprising a control unit 41, an isolating transformer 43 and an alarm sounder 45. Also illustrated is the cold tap 7, the hot tap 33, the solenoid valves 9, 35, the cold water supply pipe 11 and the hot water supply pipe 37. For safety reasons, in this embodiment the control system 39 is not powered directly from the 240 volts AC mains electricity supply (in case an electrical connection inadvertently arises between the control system 39 and the water 5 in the bathtub 3). The isolating transformer 43 is used to provide a 12 volt DC supply to the control system 39.

The control unit 41 comprises a relay and is operable to energise the solenoid valves 9, 35, and to activate the alarm sounder 45 for a predetermined period, in response to the reed switch 31 becoming closed. The control unit 41 includes a latch circuit so that the solenoid valves 9, 35 remain energised indefinitely after the reed switch 31 becomes closed, even if the reed switch 31 subsequently becomes open again. The latch circuit may be reset by removing power from the control unit 41.

The control unit 41 also includes circuitry to close the solenoid valves 9, 35 for a predetermined period, for example five seconds upon the application of power to the control unit 41. This is because most solenoid valves require periodic operation in order to prevent them from seizing up and so this power-on mechanism allows the solenoid valves 9, 35 to be actuated simply by momentarily interrupting the mains electricity supply to the isolating transformer 43. Of course, the solenoid valves 9, 35 could also be activated by deliberately allowing the bathtub 3 to become overfilled but this is unlikely to be a convenient way of performing the requisite actuation.

Figure 4:
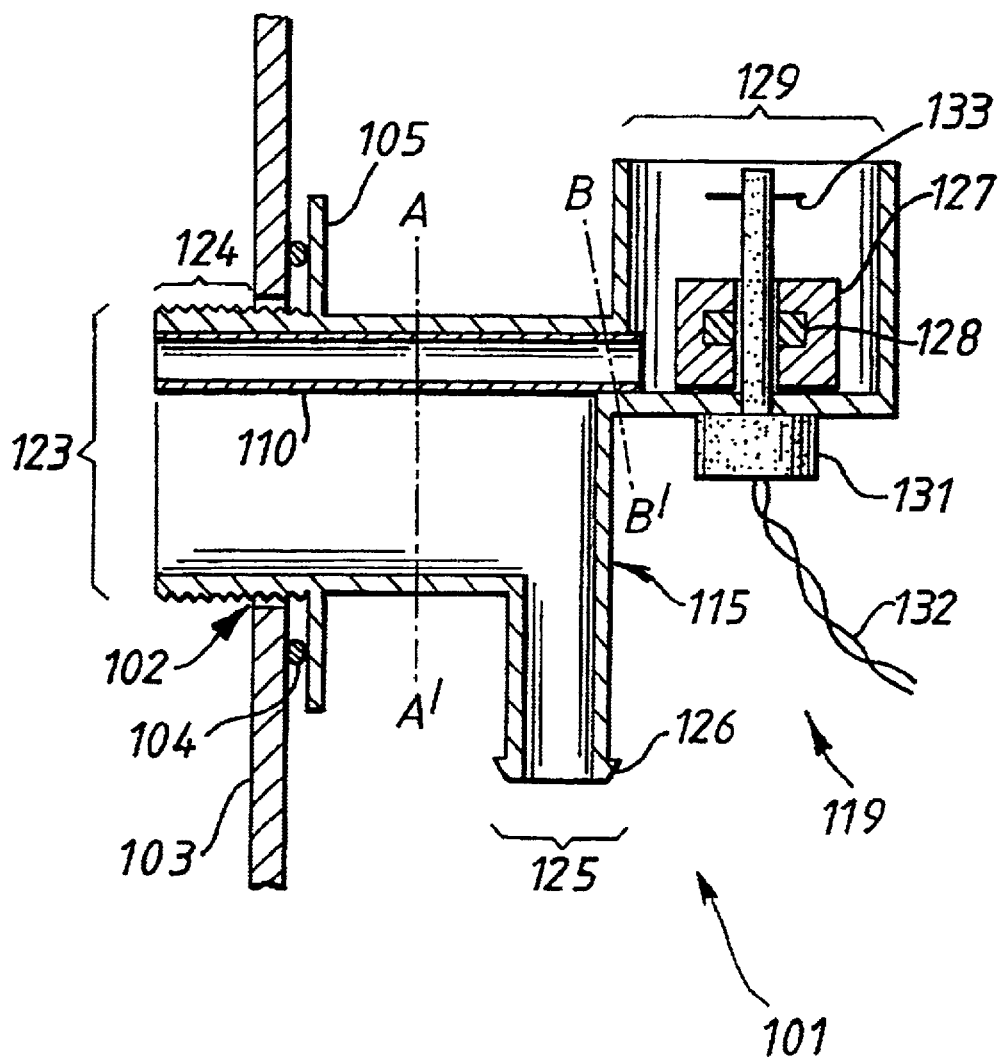
FIG. 4 shows a cross-section, in a vertical plane along the centre line of a bathtub, of a second embodiment of the invention and also shows a portion of the bathtub to which the second embodiment is mounted.

FIG. 4 shows a portion of a bath system 101, according to a second embodiment of the invention, comprising an overflow adaptor 119, an O-ring seal 104 and a portion of a vertical sidewall of a bathtub 103. Formed in the sidewall of the bathtub 103 is a circular overflow orifice 102 into which the overflow adaptor 119 is mounted.

The second embodiment allows the overflow adaptor 119 to be readily connected to the plumbing of the bathtub 103 and also allows the overflow adaptor 119 to be mounted with a stable orientation.

The overflow adaptor 119 comprises an overflow body 115 which may be formed from injection moulded plastic and which principally provides three functional regions:

(i) an inlet duct 123;
(ii) an outlet duct 125; and
(iii) a float chamber 129.

The overflow orifice 102 in the bathtub 103 defines the nominal maximum capacity of the bathtub 103 (the overflow orifice 102 is thus similar to the overflow duct 17 illustrated in FIG. 1). The overflow adaptor 119 comprises a flange 105 and is mounted on the bathtub 103 so that the flange 105 compresses the O-ring seal 104 against the exterior of the bathtub 103 and so that the inlet duct 123 protrudes into the bathtub 103. The inlet duct 123 is provided with a threaded portion 124 so that an integrated securing nut and overflow strainer (not shown) may be used to secure the overflow adaptor 119 to the bathtub 103.

The inlet duct 123 receives overflow water from the bathtub 103 and conveys this excess water to the outlet duct 125. Located within the inlet duct 123 is a feeder tube 110 which is arranged so that it lies at the top of the inlet duct 123 when the overflow adaptor 119 is mounted in its normal orientation. One end of the feeder tube 110 is co-terminous with the inlet duct 123, the other end opens into the float chamber 129 so that, if the level of water in the bathtub 103 rises to the top of the inlet duct 123, water may pass through the feeder tube 110 into the float chamber 129. In this embodiment, the inlet duct 123 has a bore of 34 mm and the feeder tube 110 has a bore of 6 mm.

Water that enters the overflow body 115 via the inlet duct 123 is able to leave via the outlet duct 125. The outlet duct 125 is a circular tube with a bore of 19 mm and is provided at its extremity with an annular lip 126. Overflow water from the bathtub 103 may pass through the outlet duct 125 to a mains drainage system (not shown) via a corrugated plastic pipe (not shown). One end of the plastic pipe connects to the outlet duct 125 whilst the other end connects to a water drainpipe (not shown) that is similar to the water drainpipe 13 of FIG. 1. The corrugated plastic pipe is retained on the outlet duct 125 by the annular lip 126 which allows the corrugated plastic pipe to be relatively easily pushed onto the outlet duct 125 but makes removal of the corrugated plastic pipe more difficult.

A portion of the overflow body 115 is adapted to form the float chamber 129. The float chamber 129 is a cylindrical chamber and is arranged so that its axis is vertical when the overflow adaptor 119 is mounted for normal use. Water may enter the float chamber 129 via the feeder tube 110 which extends radially a small distance into the float chamber 129. The top face of the float chamber is open. A reed switch 131 is glued onto the bottom of the float chamber 129, so as to form a waterproof seal. The reed switch 131 extends along the vertical axis of the cylindrical float chamber 129 as far as the top of the float chamber 129. In this embodiment the float chamber 129 has a height of 30 mm.

An annular magnet 128 is centrally and coaxially mounted within a magnetic float 127 which is mounted coaxially about the reed switch 131. The magnetic float 127, and hence the annular magnet 128, is free to move vertically along the reed switch 131 in response to the level of any water which may be present within the float chamber 129. A circlip 133 prevents the magnetic float 127 from becoming detached from the reed switch 131. Lead out wires 132 connect the reed switch 131 to the control system 39 described above in connection with FIG. 3.

In use, if the bathtub 103 becomes overfilled with water then the excess water will flow through the inlet duct 123 and out of the outlet duct 125 to the mains drainage system. If the level of water in the bathtub 103 continues to rise then eventually the water will reach the level of the feeder tube 110 (at the top of the inlet duct 123) and will flow into the float chamber 129 until at some level the magnetic float 127 will raise the annular magnet 128 sufficiently far up the reed switch 131 to open (or in an alternative embodiment, close) the contacts of the reed switch 131, thereby causing the control system 39 to activate the solenoid valves 9, 35 and stop the flow of water into the bathtub 103.

Figure 5:
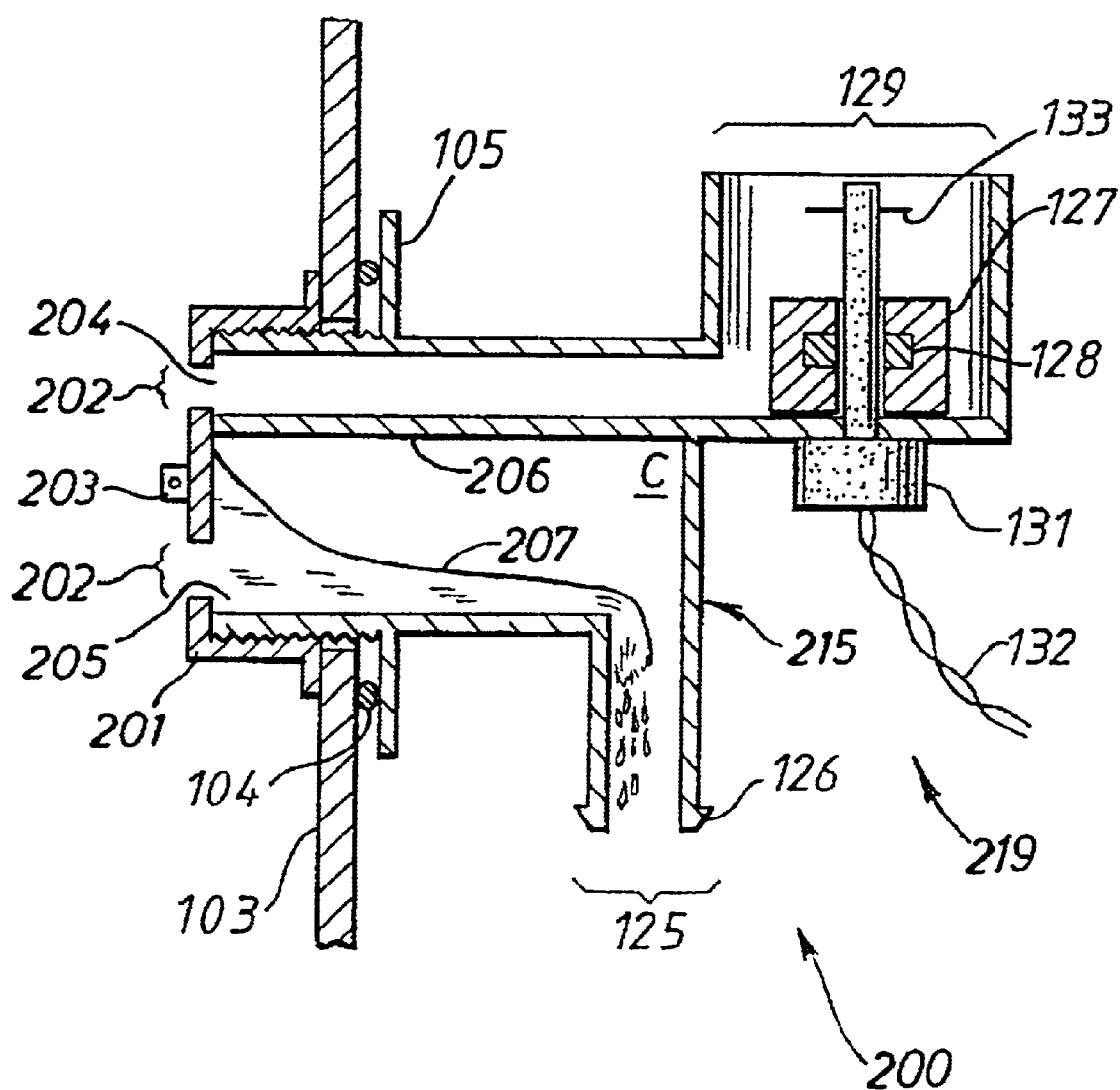
FIG. 5 shows a cross-section, in a vertical plane along the centre line of a bathtub, of a third and preferred embodiment of the invention and also shows a portion of the bathtub to which the third embodiment is mounted.

FIG. 5 shows a portion of a bath system 200, according to a third and preferred embodiment of the invention. The bath system 200 comprises an overflow adaptor 219 which comprises an overflow body 215. As was the case for the second embodiment, the overflow adaptor 219 is mounted in a circular orifice 102 in the side wall of a bathtub 103.

The overflow body 215 has the following elements in common with the overflow body 115 shown in FIG. 4: an O-ring seal 104, a flange 105, an outlet duct 125, an annular lip 126, a magnetic float 127, an annular magnet 128, a float chamber 129, a reed switch 131, lead out wires 132 and a circlip 133.

The parts in common perform the same functions as for the second embodiment.

A threaded portion of the overflow body 215 allows a rosette 201 to be screwed on to the overflow body 215 so that the rosettes 201 bears against the bath tub 103. The rosette 201 is conventional and comprises six apertures 202 (only two of which are visible in the cross sectional view of FIG. 5) and a chain attachment point 203 for securing a chain (not shown). At the other end of the chain is attached a bath plug (not shown).

Whereas the second embodiment had an inlet duct 123 the third embodiment has an upper inlet duct 204 and a lower inlet duct 205. The upper inlet duct 204 allows water that is at the level of the uppermost apertures 202 of the rosette 201 to be conveyed to the float chamber 129. The lower inlet duct 205 allows water to be conveyed from the lower apertures 202 of the rosette 201 through the overflow body 215 to the outlet duct 125.

The upper inlet duct 204 is separated from the lower inlet duct 205 by a chamber floor 206. The chamber floor 206 is an extension of the floor of the float chamber 129 and extends laterally across the overflow body 215 to abut the rosette 201. Due to the presence of the chamber floor 206, any water that enters the overflow body 215 via the rosette 201 will enter either the upper inlet duct 204 or the lower inlet duct 205.

An example of a profile of water flowing through the lower apertures 202 of the rosette 201 into the overflow body 215 (and thence to the outlet duct 125) is indicated by the water 207. As shown, the level of the water 207 adjacent the rosette 201 is substantially at the top of the lower inlet duct 205 but as the water flows through the lower inlet duct 205 and increases in velocity, the level of the water 207 decreases with position along the lower inlet duct 205. For example, the level of the water 207 may drop several centimeters from the rosette 201 to the outlet duct 125 so that when the water joins the outlet duct 125 the level of the water is only a few millimeters above the floor of the lower inlet duct 205.

When compared to the prior art, an advantage of the third embodiment is that the third embodiment can be guaranteed to activate the solenoid valves 9, 35 whenever the level of water in the bathtub 103 rises to a level where water passes through the upper apertures 202 of the rosette 201 and into the flow chamber 129. In contrast, in some prior art embodiments, sensors are positioned in a region corresponding to that denoted by C in FIG. 5. Due to the profile of water flowing through the rosette 201, a sensor in the region C cannot be guaranteed to come into contact with water even if the level of water in the bathtub is higher than the rosette 201.

A further advantage of the third embodiment over the prior art is that the reed switch 131 will become opened as soon as the level of water in the bathtub 103 approaches the top of the rosette 201. In some prior art embodiments, the entry of water into a bathtub is only stopped when water has become backed up all the way from a water drain pipe to a sensor. The period of time during which water flows from a water drain pipe whilst backing up towards the sensor corresponds to an unnecessary waste of water.

FIG. 6 shows a cross-sectional view of a fourth embodiment 300 of the invention. The fourth embodiment 300 is particularly suitable for retro-fitting to existing bath systems by cutting the overflow conduit (not shown) between the overflow of the bathtub and a water drain pipe (not shown) and inserting the fourth embodiment in-line between the two pieces of the cut overflow conduit. The fourth embodiment is substantially cylindrical and is orientated so that, in use, its cylindrical axis is vertical.

The fourth embodiment 300 comprises an upper piece 301 and a lower piece 303, both formed from injection moulded plastic. The upper piece 301 is provided with an inlet port 302 for allowing overflow water into the fourth embodiment 300, the lower piece 303 is provided with an outlet port 304 for allowing water to drain from the fourth embodiment 300 to the water drain pipe. The inlet port 302 and the outlet port 304 are each provided with respective lips 305 so that the respective pieces of the cut overflow conduit may be securely attached to the ports 302, 304.

The lower piece 303 and the upper piece 301 are provided with cooperating threaded portions 306 so that the lower piece 303 may be screwed into the upper piece 301.

A magnetic float 308 is held captive within a float chamber defined by a float chamber wall 307 and the lower piece 303. The magnetic float 308 is held captive by float chamber lips 309 which allow the magnetic float 308 to be inserted into the float chamber but prevent it from escaping. The magnetic float 308 comprises a bar magnet, the poles of which are indicated by N and S, respectively. The float chamber is provided with a float chamber drain 310 which allows water to drain relatively slowly from the float chamber. Thus when overflow water enters the float chamber, via the inlet port 302, at a rate greater than the rate at which water can drain out of the float chamber via the float chamber drain 310, the magnetic float 308 will rise up in the float chamber to the alternative position 308'.

When the float chamber is substantially empty of water, the magnetic field from the S pole of the magnetic float 308 extends out, through the lower piece 303, to close the contacts of a reed switch 311. The reed switch 311 is connected to solenoid valves (not shown) via lead out wires 312.

Also provided in the fourth embodiment 300 is a bypass channel 313. The bypass channel 313 allows excess water, when overflow water enters the fourth embodiment 300 at a rate greater than the flow rate of the float chamber drain 310, to pass substantially unimpeded through the fourth embodiment 300. Without the bypass channel 313 the aggregate flow rate of water through the fourth embodiment 300 would be limited to that of the float chamber drain 310.

Modifications to the bath systems 1, 101, 200, the fourth embodiment 300 and the control system 39 hitherto presented will now be discussed.

In the embodiments previously discussed, the overflow duct 17 and the inlet duct 23 were substantially horizontal. In alternative embodiments, they may instead be inclined, either upwards or downwards.

In a modification to the overflow adaptor 119, the float chamber 129 is dispensed with and the magnetic float 127, together with the reed switch 131, is positioned in the inlet duct 123. A suitable position in the inlet duct 123 is indicated by the line AA' in FIG. 4. The overflow body 115 may conveniently be sealed across the line BB' in FIG. 4, and the feeder tube 110 may be dispensed with. Advantages of this modification are that the overflow adaptor is simplified by the omission of the float chamber 129, and that the overflow adaptor becomes watertight from the inlet duct 123 through to the outlet duct 125.

In a further modification to the overflow adaptor 119, the feeder tube 110 and the float chamber 129 may be retained but the feeder tube 110 (and, correspondingly, the float chamber 129) may be located at an alternative position, for example half way up, or at the bottom of, the inlet duct 123. These alternative positions for the feeder tube 110 and the float chamber 129 would allow the reed switch 131 to be activated when the inlet duct 123 is only partially full of overflowing water.

In a yet further embodiment of the overflow adaptor 119, the outlet duct 125 may have a greater bore, and hence flow capacity, than the inlet duct 123. For this yet further embodiment, the feeder tube 110 is preferably modified so that it is no longer co-terminous with the plane of the inlet duct but instead extends beyond the inlet duct into the bathtub 103. This extension of the inlet tube would allow the level of the water in the bathtub 103 to be sensed even though the constriction (referred to in an earlier embodiment in terms of a1 and a2) is now provided by the inlet duct. Alternatively, the feeder tube 110 may be dispensed with, so that the float chamber 129 opens out into the inlet duct 124 across the line BB'.

In a modification to the third embodiment, instead of the overflow body 215 being provided with a fixed chamber floor 206, a removable chamber floor is provided so that access may be readily gained to the float chamber 129 (for example for cleaning) by unscrewing the rosette 201 from the overflow body 215. It is only necessary that the portion of the chamber floor 206 that separates the upper inlet duct from the lower inlet duct 205 be removable.

In another variation of the third embodiment, a removable flow restriction may be provided in the upper inlet duct 204 to reduce the rate at which water may pass from the rosette 201 to the float chamber 129. The reduced flow rate will, in effect, form a low pass filter so that splashes or surges in the water level of the bathtub 103 do not cause the reed switch 131 to become closed. The ability to remove such an orifice for cleaning is particularly important so that it does not become blocked.

Although the chamber floor 206 in the third embodiment was described as extending laterally across the overflow body 215 so as to abut the rosette 201, it is not essential that the chamber floor abuts the rosette 201. In modified embodiments the chamber floor is arranged so that there is a small separation between it and the rosette. However, due the profile of the water 207, the chamber floor in such modified embodiments must terminate sufficiently close to the rosette 201 so that, when the level of water in the bathtub 103 is at the top of the rosette 201, water will enter the upper inlet duct 204. If the chamber floor is too far away from the rosette 201 then the level of the water 207 will drop below the upper inlet duct 204 before the water 207 has a chance to enter the upper inlet duct 204.

In the second and third embodiments a single float is shown in conjunction with a single reed switch 131. In an alternative embodiment, two separate reed switches are provided, each with its own magnetic float. By positioning the reed switches at different heights with respect to the floor of the float chamber 129, several alternative water levels may be provided at which a reed switch will become closed. By default, the lower water level is selected. To select the upper water level, the magnetic float (the 'lower' magnetic float) corresponding to the lower water level is secured to its reed switch so that the lower magnetic float cannot move in response to the water level in the flow chamber 129. The solenoid valves 9, 35 will thus only be actuated when the level of water in the flow chamber 129 rises to the higher water level.

One way in which the lower magnetic float may be secured to its reed switch is by providing a plastic grub screw in the lower magnetic float. The grub screw is arranged to allow the lower magnetic float to be secured to the reed switch. The grub screw may conveniently be rotated by inserting the shaft of a screwdriver through the upper inlet duct 204 to reach the grub screw.

One way of allowing one of two alternative water levels to be selected is by arranging for the magnet inside a magnetic float to be mounted at one end of the magnetic float. Inverting such a magnetic float will change the distance between the magnet and its reed switch, thus changing the water level that is required in the float chamber 129 to move the magnetic float so that the reed switch is closed.

In alternative bath systems, the control unit may be directly connected to the mains electricity supply or may be powered by batteries.

The solenoid valves 9, 35 are of the normally open type although, with suitable modifications to the control unit 41, normally closed solenoid valves could be used instead. An advantage of using normally open solenoid valves is that the Water Research Council (WRC), which is the body responsible in the UK for approving components for connection to the water supply, has a preference for normally open valves as these are less likely to stagnate and accumulate bacteria than normally closed valves. Another advantage of using a normally open solenoid valve is that such a valve may be directly connected to the reed switch 31 and isolating transformer 43, in which case the reed switch 31 would itself act as a control unit. However an advantage of using normally closed solenoid valves is that in the event of a power cut they will close and prevent water from being introduced into the bathtub 3.

Other types of valve may be used instead of solenoid valves, for example, motorised butterfly valves. In some situations the water may be supplied to the taps 7, 33, by an electric pump in which case solenoid valves would not be required as the flow of water could be stopped by using the reed switch 31 to control the supply of power to the electric pump.

Although in the embodiment previously described, solenoid valves 9, 35 were used which completely stopped the flow of water through them, in an alternative embodiment a different type of solenoid valve is used which merely restricts the flow of water. The overriding requirement to prevent the bathtub 3 from being overfilled is that the (combined) flow rate of the taps 7, 33 is reduced to below the flow rate of the outlet duct 25, thereby ensuring that the overflow duct 17 and overflow assembly 19 can discharge any excess water in the bathtub 3 and any extra water flowing from the taps 7, 33 to the water drainpipe 13.

In a further embodiment, the solenoid valves 7, 35 are dispensed with and an electric pump is used to pump the excess water out of the bathtub 3, thereby augmenting the overflow assembly 19 so that the total flow rate of water out of the bathtub 3 exceeds the flow rate of the taps 7, 33.

In a modified control unit the activation of the solenoid valves 9, 35 is not latched. If the bathtub 3 overfills for this modified embodiment, the solenoid valves 9, 35 will be briefly actuated, until the level of the backed-up water 51 drops below the outlet duct 25, at which point the solenoid valves 9, 35 will open again and the bathtub 3 will start refilling until an excessive level of backed-up water 51 is produced again. This cycle may continue indefinitely.

The cyclic operation of the solenoid valves 9, 35 can give rise to a "wave effect" when the bath system 101 of FIG. 4 is used. In the above cycle, a pulse of water will be allowed into the bathtub 3 each time the solenoids valves 9, 35 are opened. In some situations, the frequency of the cycles may coincide with a resonance frequency of one of the standing wave modes of the bathtub 3. The periodic pulses of water flowing into the bathtub 3 may excite a standing wave until the peak amplitude of the standing wave is such that water flows over the sides of the bathtub. In order to prevent excitation of standing wave modes the reed switch 131 may be provided with hysteresis so that the water levels at which the solenoid valves 9, 35 are opened and closed are different. Another way of reducing the likelihood of standing wave modes being excited is to ensure that whenever the solenoid valves 9, 35 are actuated they are always done so for a minimum period of, for example, 20 seconds. The 20 second period allows any residual motion of the water in the bathtub to die away before the next pulse of water is introduced into the bathtub.

As an alternative to the reed switch 31, a Hall effect sensor may be used to detect the position of the magnetic float 27. A Hall sensor with a proportional output may be used to indicate the position of the magnetic float 27 (instead of merely indicating if a threshold level has been reached) and may thus be used to actuate the solenoid valves in proportion to the water level. Differential and integral responses could also be used, in addition or alternatively, to actuate the solenoid valves.

As an alternative to constraining the magnetic float 27 within the float cage 29, a float with an optically reflective portion on its top may be attached via a lateral cantilever to a modified inlet duct and the position of this reflective float may be sensed by an optical proximity sensor via a transparent portion provided in the overflow assembly. In a yet further embodiment, the float could be dispensed with altogether and an optical sensor, for example of the total internal reflection type, could be used to detect the level of any backed-up water 51 within the inlet duct 23.

In the embodiment of the bath system 1, the overflow assembly 19 was provided with an inlet duct 23 having a cross-sectional area, a1, greater than that, a2, of the outlet duct 25. However, the overriding requirement is that the maximum flow rate of the overflow duct 17, and of the inlet duct 23, is greater than the maximum flow rate of the outlet duct 25. This could alternatively be achieved by using a modified overflow assembly in which, instead of having a distinct inlet duct 23 and outlet duct 25, the bore of the modified overflow assembly continuously tapers from the overflow duct 17 to the water drainpipe 13 (narrowing towards the water drainpipe 13). In a yet further alternative, an overflow assembly may have a uniform cross-section from the overflow duct 17 to the water drainpipe 13 but be provided with an extended outlet duct of such great length that viscous fluid effects of the water result in the extended outlet duct having a reduced flow rate (compared to the relatively short inlet duct 23 in the vicinity of the magnetic float 27), thereby causing water to become backed up in the inlet duct. In another modification, the bores of the inlet duct 23 and outlet duct 25 are identical but an obstruction mounted in the outlet duct 25 reduces the flow rate of the outlet duct 25.

In a further embodiment, a modified overflow assembly does not connect to the water drainpipe 13 but instead has a separate connection to a mains drainage system.

The second and third embodiments were described in conjunction with a circular overflow orifice 102 formed in the sidewall of a bathtub 103. On other types of bathtub, a stub pipe is provided, instead of an overflow orifice, to convey water out of the bathtub. The stub pipe projects from the exterior sidewall of the bathtub and allows a corrugated plastic tube to be connected directly from the stub pipe to the water drainpipe 13. The second and third embodiments may be modified for use with such bathtubs or the fourth embodiment may be inserted in-line into the corrugated plastic tube.

Although the overflow system according to the present invention has been described in terms of a bath system, it may also be applied, for example, to showers, sinks and bidets. Furthermore, the overflow system may also be used in conjunction with fluids other than water.

What is claimed is:

1. An overflow detector for detecting when overflow liquid flows out of a vessel through an overflow outlet of the vessel, at a flow rate that exceeds a predetermined flow rate, the overflow detector comprising:
   a body for mounting to the overflow outlet, wherein the body comprises a conduit for conveying overflow liquid, the conduit comprising an inlet and an outlet;
   a sensor for sensing the presence of overflow liquid and providing a signal in response to the overflow liquid;
   wherein the conduit comprises a divider dividing the conduit into an upper portion and a lowermost portion with reference to the orientation of the overflow detector when the overflow detector is orientated for use, wherein the upper portion provides a liquid communication path between the inlet and the sensor, and wherein the lowermost portion provides a liquid communication path between the inlet and the outlet.

2. A detector according to claim 1, wherein the divider extends to the inlet of the conduit.

3. A detector according to claim 1, wherein the divider is formed by the wall of a tube located within the conduit and wherein the interior of the tube forms the upper portion.

4. A detector according to claim 3, wherein, with reference to the orientation of the detector when the detector is orientated for use, the tube is located in an uppermost part of the conduit.

5. A detector according to claim 1, wherein the sensor comprises a float.

6. A detector according to claim 5, wherein the float comprises a magnet.

7. A detector according to claim 6, wherein the sensor comprises a reed switch.

8. A detector according claim 1, wherein the detector comprises a flange for mounting against the overflow outlet, and a threaded portion on the periphery of the conduit between the inlet and the flange.

9. A detector according claim 1, wherein the detector is adapted for cooperation with a bathtub.

10. The combination of an overflow detector according to claim 1, and a vessel.

11. An overflow system comprising:
    a vessel having an overflow outlet;
    supply pipes for supplying liquid to the vessel;
    an overflow detector including:
       a body for mounting to the overflow outlet, wherein the body comprises a conduit for conveying overflow liquid, the conduit comprising an inlet and an outlet;
       a sensor for sensing the presence of overflow liquid and providing a signal in response to the overflow liquid;
       wherein the conduit includes a divider dividing the conduit into an upper portion and a lowermost portion with reference to the orientation of the overflow detector when the overflow detector is orientated for use, wherein the upper portion provides a liquid communication path between the inlet and the sensor, and wherein the lowermost portion provides a liquid communication path between the inlet and the outlet;
    valve means operable to reduce the flow rate of liquid being supplied to the vessel by the supply pipes; and
    control means operable to activate the valve means in response to the signal from the overflow detector.

12. A system according to claim 11, wherein the valve means comprises a solenoid valve.

13. A system according to claim 11, wherein the valve means is operable to stop the flow of liquid to the vessel.

14. A system according to claim 11, wherein the control means comprises a latch means operable to cause, response to the signal from the overflow detector, the control means to continue to cause the valve means to reduce the flow rate of liquid until the control means is reset.

15. An overflow system according to claim 11, wherein the control means comprises a relay.

16. A kit of parts comprising:
    an overflow detector including:
       a body for mounting to an overflow outlet of a vessel, wherein the body comprises a conduit for conveying overflow liquid, the conduit comprising an inlet and an outlet;
       a sensor for sensing the presence of overflow liquid and providing a signal in response to the overflow liquid;
       wherein the conduit comprises a divider dividing the conduit into an upper portion and a lowermost portion with reference to the orientation of the overflow detector when the overflow detector is orientated for use, wherein the upper portion provides a liquid communication path between the inlet and the sensor, and wherein the lowermost portion provides a liquid communication path between the inlet and the outlet;
    valve means operable to reduce the flow rate of liquid being supplied to the vessel by a supply pipe; and
    control means operable to activate the valve means in response to the signal from the overflow detector.

* * * * *